Feb. 22, 1927.

E. J. JOHNSON 1,618,880

BUMPER

Filed April 22, 1925    3 Sheets-Sheet 1

E. J. Johnson INVENTOR

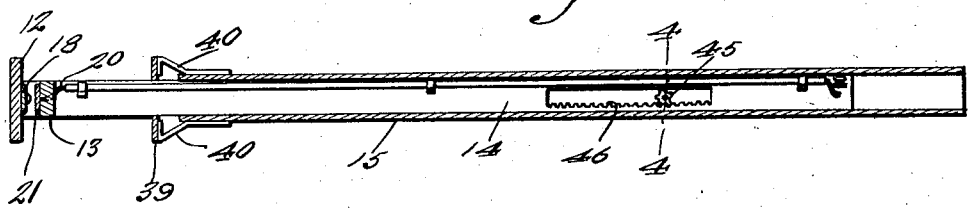
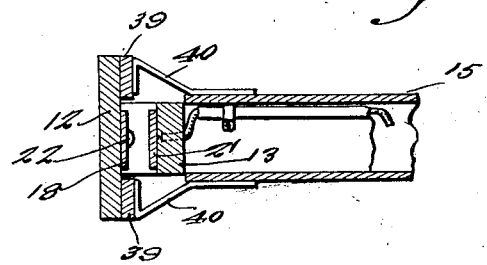
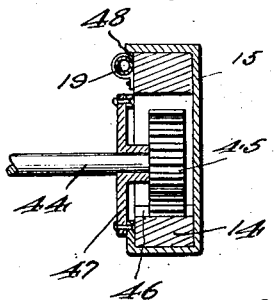
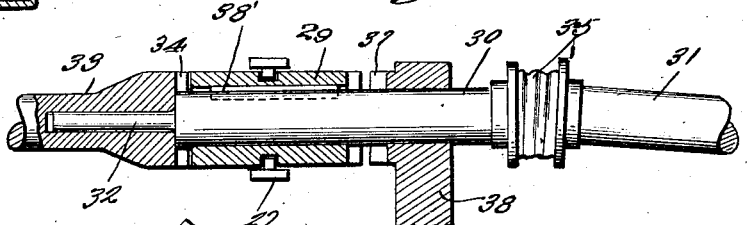
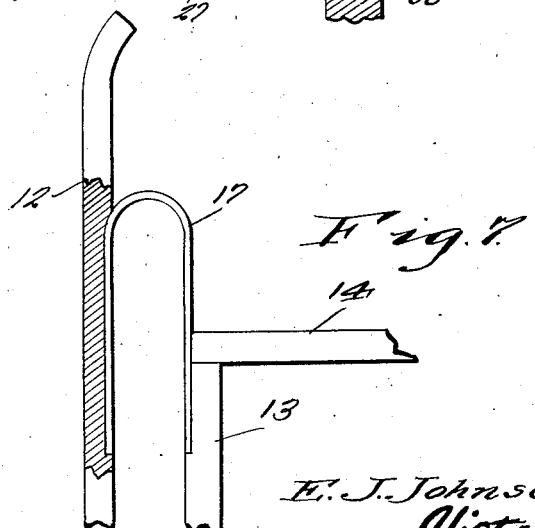

Feb. 22, 1927.
E. J. JOHNSON
BUMPER
Filed April 22, 1925   3 Sheets-Sheet 3
1,618,880
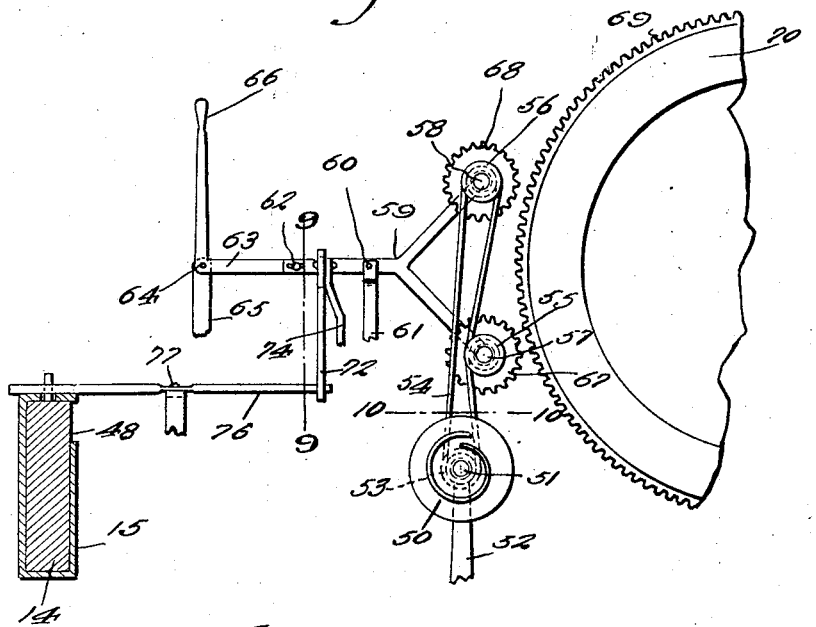
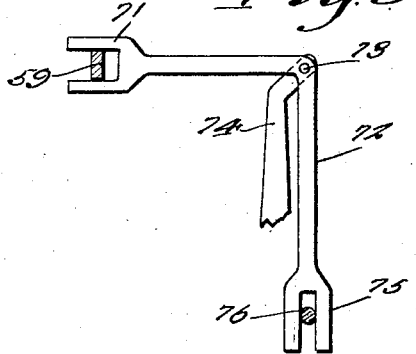
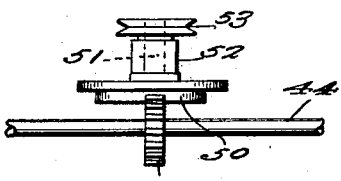
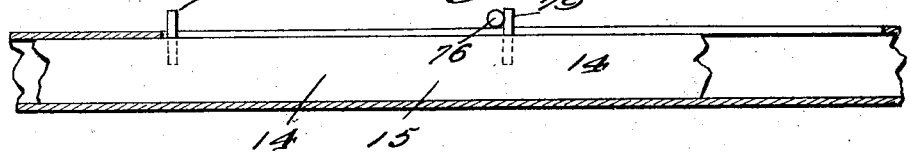
E. J. Johnson INVENTOR
BY Victor J. Evans ATTORNEY
WITNESS:

Patented Feb. 22, 1927.

1,618,880

UNITED STATES PATENT OFFICE.

ERNEST J. JOHNSON, OF ST. CLOUD, MINNESOTA.

BUMPER.

Application filed April 22, 1925. Serial No. 25,094.

This invention relates to safety devices for automobiles and has for an object the provision of means actuated by a bar or bumper which is carried by the automobile for automatically stopping the same in the event of the bar or bumper striking a person or object.

Another object of the invention is the provision of means for setting or positioning the bar or bumper so as to prevent tampering by unauthorized persons and thus prevent possible damage to the automatic stopping mechanism when the automobile is parked.

With the above and other objects in view, the invention further includes the following novel features and details of construction, to be hereinafter more fully described, illustrated in the accompanying drawings and pointed out in the appended claims.

In the drawings:—

Figure 3 is an enlarged fragmentary longitudinal sectional view through one of the bumper guides.

Figure 4 is an enlarged section taken substantially on the line 4—4 of Figure 3.

Figure 5 is an enlarged fragmentary longitudinal section through the bumper and one of the bumper guides with the parts in a different position from that illustrated in Figure 3.

Figure 6 is an enlarged sectional view taken longitudinally of the drive shaft of the automobile and illustrating the automatic clutch.

Figure 7 is a fragmentary plan view partly in section showing one end of the bumper.

Figure 8 is an enlarged fragmentary elevation partly in section illustrating the bumper moving mechanism, the mechanism being shown in neutral position.

Figure 9 is an enlarged fragmentary section taken substantially on the line 9—9 of Figure 8.

Figure 10 is a section on the line 10—10 of Figure 8.

Figure 11 is a fragmentary longitudinal sectional view through one of the bumper guides with a portion of one of the side bars of the bumper shown in elevation.

Figure 1:
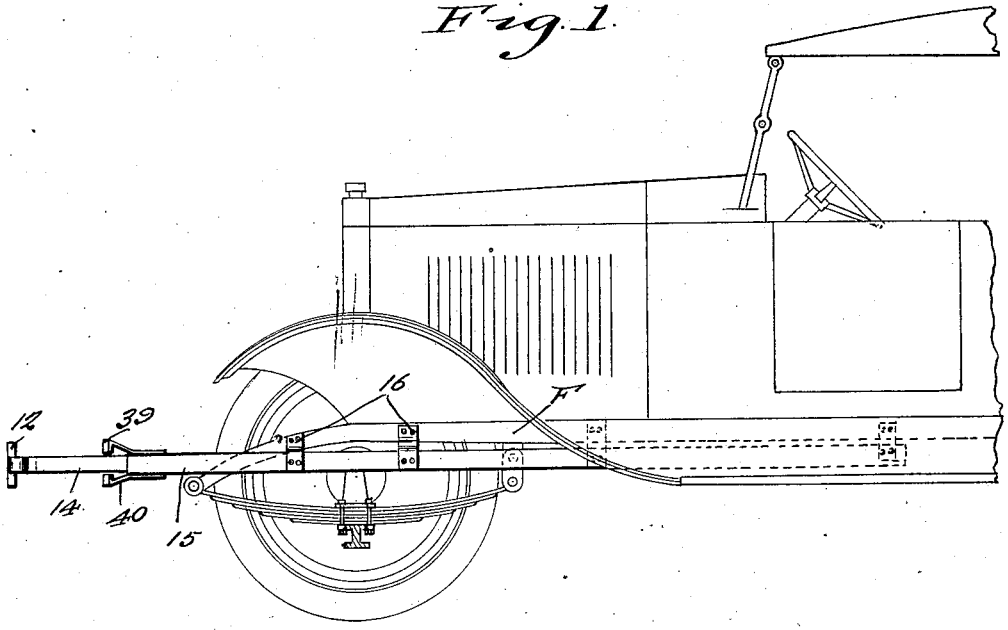
Figure 1 is a side elevation partly in section illustrating a portion of an automobile with the invention applied.

Referring to the drawings in detail wherein like characters of reference denote corresponding parts, the reference character 12 indicates a bar or bumper which extends transversely in front of the automobile after the manner of the usual bumper bar. The bar 12 however is carried by a substantially U-shaped frame which includes a cross bar 13 and side bars 14, the latter being movable longitudinally in bumper guides 15 which extend longitudinally upon opposite sides of the frame F of the automobile and to which they are secured by brackets 16 or other suitable fastening devices. The bar 12 is secured to the slidable U-shaped frame at the opposite forward corners of the latter, substantially U-shaped springs 17 being provided for this purpose. When the bar 12 strikes a person or object, the springs 17 will be compressed so as to permit the bar to move inward toward the U-shaped frame.

The bar 12 carries a conductor strip 18 which has one of its ends connected to a conductor wire 19 extending rearwardly to the battery B of the automobile, the said conductor wire being secured to and movable with one of the side bars 14 of the sliding frame. The opposite side bar 14 of the sliding frame has also secured thereto a conductor wire 20 whose outer end is secured to a contact 21 located opposite a contact 22 carried by the strip 18, so that when the bar 12 is forced inward, the contacts 21 and 22 will engage for a purpose later explained.

The inner end of the conductor wire 20 is connected to one terminal of an electromagnet 23, the opposite terminal of which is connected by means of a conductor 24 to the battery B so that when the contacts 21 and 22 engage, a circuit will be completed through the battery and the electromagnet 23 so that the latter will be energized.

Located within the field of the core of the magnet 23 is a pivotally mounted armature 25, the latter being provided with an offset portion or bill 26 which engages one end of a pivoted lever 27, the latter being mounted for pivotal movement as indicated at 28. The opposite end of this lever has a sliding pivotal connection with a clutch member 29 which is keyed to and slidable upon a section 30 included in the drive shaft 31 of the automobile. This shaft section 30 has its inner end reduced as shown at 32 in Figure 6 of the drawings so that the adjacent section 33 of the drive shaft provides a bearing for one end of the shaft section 30. A clutch face 34 is provided on the outer end of the drive shaft section 33 and is adapted to be engaged by a clutch face provided upon the adjacent end of the slidable clutch member 29. A universal joint 35 connects the shaft section 30 with the shaft section 31 so that when the clutch member 29 is engaged with the shaft section 33, the differential mechanism (not shown) of the automobile will be operated in the usual manner.

Should the bar 12 strike a person or object and cause the contacts 21 and 22 to engage, a circuit will be completed and the electromagnet energized as previously stated. The armature 25 will then be actuated so that its latch or bill will release the lever 27 and the latter will be moved pivotally under the action of a spring 36 so as to disengage the clutch member from the clutch face 34 and cause the opposite end of the said clutch member to engage a clutch face 37 provided upon a stationary bearing bracket 38. As the clutch member 29 is keyed upon the shaft section 30 as indicated at 38' in Figure 6 of the drawings, rotation of the drive shaft will be prevented so that the automobile will be brought to a stop. As the side bars 14 of the bumper frame ar slidingly mounted in the bumper guides 15, the bumper bar 12 will be permitted a further limited inward movement, or until the bar 12 engages spaced upper and lower stop bars 39 which extend transversely in front of the automobile and which are secured to the bumper guides 15 by bracket arms 40. The outermost position of the bumper bar 12 is illustrated in Figure 4 of the drawings, while the inner position of said bar is illustrated in Figure 5.

In order to prevent the conductor wires 19 and 20 from sagging downward due to the longitudinal movement of the bars 14 to which they are attached, there is pivotally secured to the inner ends of each of these arms, supporting arms 41, while the outer ends of these supporting arms are pivotally secured to arms 42, the latter being pivotally mounted upon the cross bar or other portion of the automobile frame as shown at 43.

Figure 2:
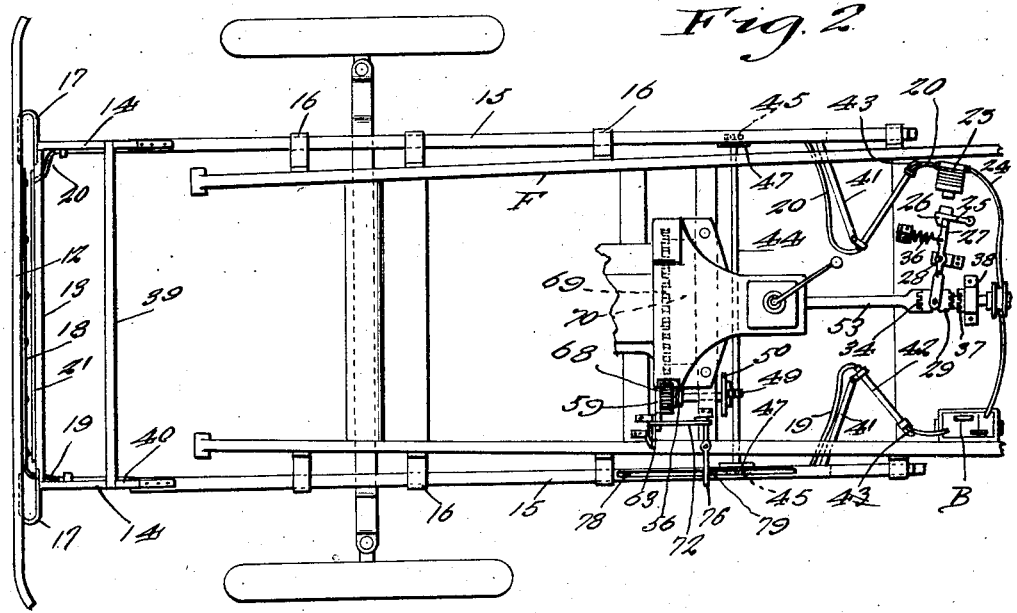
Figure 2 is a top plan view of the front part of the automobile chassis with parts broken away.

When the automobile is parked, the bumper bar 12 will ocupy the position shown in Figure 5 of the drawings, the contacts 21 and 22 being spaced apart and any inward movement of the bar 12 which might result in engagement between these contacts is resisted by the spaced rigid bars 39. When it is desired to project the bar 12 forward in position for use as illustrated in Figures 1, 2 and 3 of the drawings, mechanism which operatively associates the bars 14 with the automobile mechanism is brought into action. This mechanism comprises a shaft 44 which is mounted in suitable bearings transversely of the automobile and which has secured upon its opposite ends pinions 45, the latter engaging the teeth of racks 46 carried by the side bars 14. The guides 15 are substantially rectangular in shape and openings in the opposed faces of these bumper guides 15 are provided for the insertion of the gears 45, the openings being normally covered by cover plates 47. It may be here stated that the bumper guides 15 are further provided with longitudinally extending slots 48 in their opposed faces to accommodate the conductor wires 19 and 20.

Secured upon the shaft 44 is a gear 49 which is engaged by a spiral gear 50, the latter being mounted upon a shaft 51 which is carried by a bearing bracket 52, the latter being suitably secured to the frame of the automobile. The shaft 51 is provided with a grooved pulley 53 around which passes a belt 54, the latter also passing around grooved pulleys 55 and 56 which are carried respectively by shafts 57 and 58. These last mentioned shafts are mounted in bearings provided at the outer forked ends of a substantially Y-shaped lever 59, the latter being pivotally mounted as indicated at 60 upon a bracket or arm 61. The lever 59 has a sliding pivotal connection 62 with one end of a bell crank lever 63, the latter being pivotally mounted as at 64 upon a bearing bracket 65. One arm of the bell crank lever 63 forms an operating lever 66.

Mounted upon the shafts 57 and 58 respectively are pinions 67 and 68, the latter being adapted to be moved into and out of engagement with a gear 69 carried by the fly wheel 70 of the automobile engine. The belt 54 passes over the pulleys 53 and 56 in the usual manner, but passes completely around the pulley 65. The purpose of arranging the belt 54 in this manner will be later explained.

Engaging over the Y-shaped lever 59 is the forked end 71 of a bell crank lever 72, the latter being pivotally mounted as shown at 73 upon a bracket arm 74. The opposite end of the lever 73 is forked as shown at 75 to engage over one end of a lever 76, the latter being pivotally mounted as shown at 77. The opposite end of the lever 76 extends over one of the bumper guides 15 into the path of movement of spaced pins 78 and 79 which are carried by one of the side bars 15 of the sliding frame.

When it is desired to project the bar 12 outward for use, the lever 66 is moved in a direction to cause the pinion 68 to engage the gear 69 upon the fly wheel 70. Operation of the automobile engine will thus operate the pinion 56 and the latter will, through the belt 54, pulleys 53 and 56 and the gears 49 and 50, rotate the shaft 44 in a direction to move the sliding frame outward, the frame carrying with it the bar 12. Outward movement of the frame will be automatically stopped when the pin 27 engages the lever 76, the said pinion causing the lever 76 to be moved pivotally to rock the bell crank lever 72 so that the latter will move the Y-shaped lever 59 pivotally to disengage the pinion 68. By moving the lever 66 in an opposite direction and causing the pinion 67 to engage the gear 69, reverse rotary movement will be imparted to the shaft 51 due to the manner of engagement of the belt 54 with the pulley 55. This will cause a reverse rotary movement of the shaft 44 and will move the sliding frame of the bumper inward until the pin 77 engages the lever 76, whereupon the bell crank lever 72 will be moved pivotally in a reverse direction so as to reverse the pivotal movement of the Y-shaped lever 59 and disengage the pinion 67.

The invention is susceptible of various changes in its form, proportions and minor details of construction and the right is herein reserved to make such changes as properly fall within the scope of the appended claims.

Having described the invention what is claimed is:—

1. The combination with a motor operated vehicle, of a bumper mounted for horizontal sliding movement on the vehicle, a sliding clutch member mounted on the drive shaft, means cooperating with said clutch member for holding the driving wheels of the vehicle immovable, means for normally holding the clutch member spaced from said means, and electrically operated means controlled by the inward movement of the bumper for shifting the clutch member into engagement with its cooperating means to lock the wheels against rotation.

2. The combination with a motor operated vehicle, of a bumper mounted for horizontal sliding movement, a sliding clutch member associated with the drive shaft of the vehicle, a cooperating member normally spaced from the sliding clutch but adapted to be engaged thereby to hold the driving wheels of the vehicle immovable, means for normally holding the sliding clutch associated with the drive shaft for the operation of the driving wheels of the vehicle, and electrically operated means controlled by the inward movement of the bumper to render the wheel holding means active.

3. The combination with a motor operated vehicle, of a bumper mounted for horizontal sliding movement thereon, a sectional drive shaft, a sliding clutch member keyed on one section of the shaft, opposed stationary clutch members arranged at the opposite ends of the sliding clutch member and adapted to be alternately engaged by the latter, one of said stationary clutch members holding the driving wheels against rotation when associated with the sliding clutch member, means for normally holding the sliding clutch member spaced from the last mentioned stationary clutch member, and electrically operated means controlled by the inward movement of the bumper for shifting the sliding clutch member into engagement with said stationary clutch member to lock the wheels against rotation.

4. The combination with a motor operated vehicle, of a bumper mounted for sliding movement thereon, a sectional drive shaft, a sliding clutch member keyed on one section of the shaft, cooperating clutch members arranged at the opposite ends of the sliding clutch member and adapted to be alternately engaged by the latter, one of said clutch members when engaged by the sliding clutch member holding the driving wheels against rotation, a pivoted lever connected with the sliding clutch member, a pivot latch for normally holding the lever in a position to space the sliding clutch from the last mentioned cooperating clutch member, an electro-magnet included in a normally open circuit and adapted to be energized upon the inward movement of the bumper to release the lever from said element, and means for shifting said lever and sliding clutch member in a direction to render the wheel holding means active.

5. The combination with a motor operated vehicle having a bumper mounted for sliding movement, and means associated with the driving mechanism of the vehicle and controlled by the inward movement of the bumper for holding the wheels against rotation, of means for supporting the bumper for movement longitudinally of the frame of the vehicle, whereby the bumper can be positioned to render it inactive when the vehicle is parked, and power operated means for moving the bumper in its entirety longitudinally of the frame to either its active or inactive position.

In testimony whereof I affix my signature.

ERNEST J. JOHNSON.